Sept. 24, 1957 B. A. MAIN, JR 2,807,481
COMPRESSION TUBE JOINT FOR FLARELESS RIGID TUBES
Filed Feb. 13, 1953
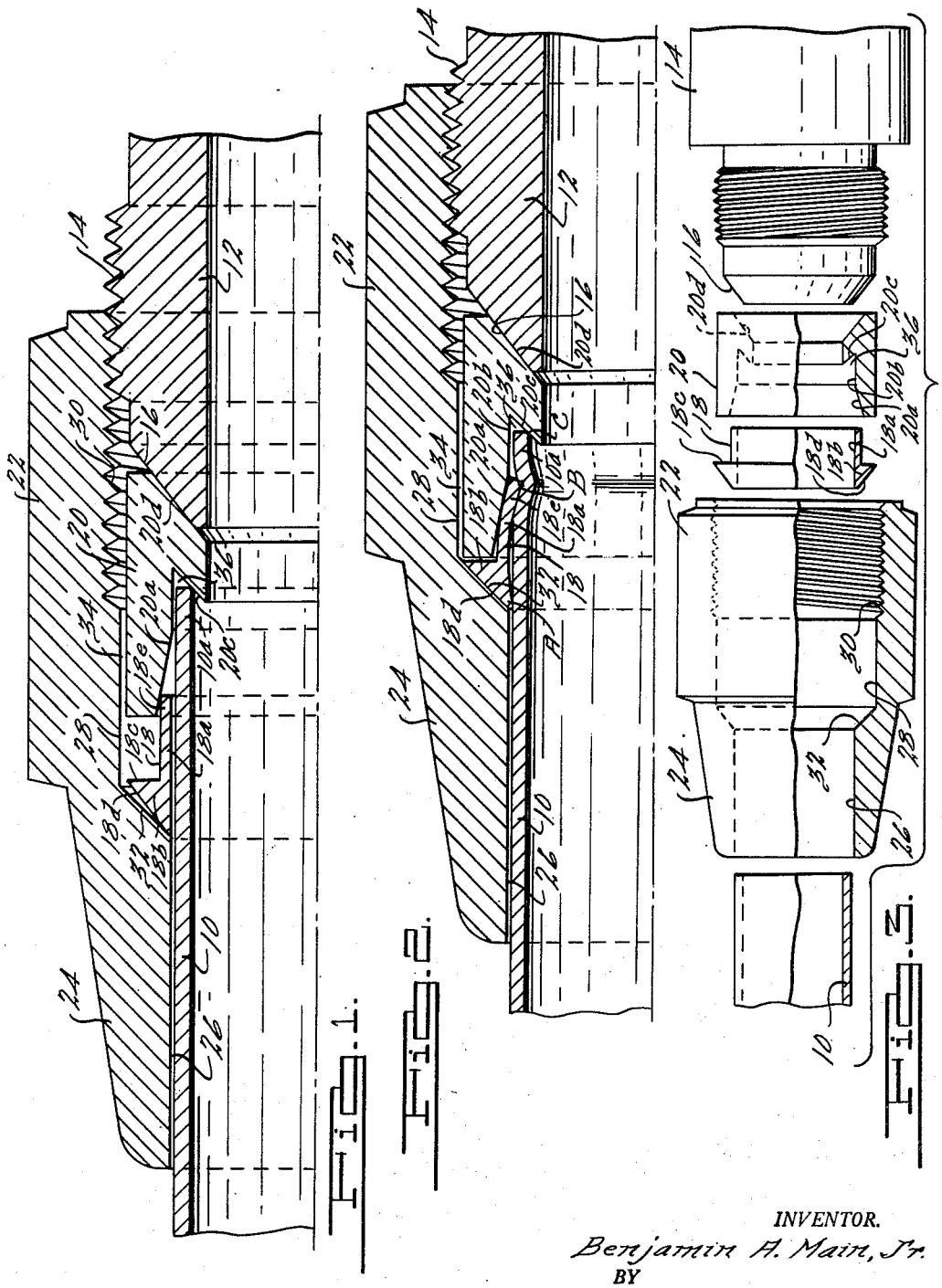
INVENTOR.
Benjamin A. Main, Jr.
BY
Townsend & Beaman
ATTORNEY

United States Patent Office 2,807,481
Patented Sept. 24, 1957

2,807,481

COMPRESSION TUBE JOINT FOR FLARELESS RIGID TUBES

Benjamin A. Main, Jr., Rives Junction, Mich., assignor to Aeroquip Corporation, Jackson, Mich., a corporation of Michigan Application February 13, 1953, Serial No. 336,759

1 Claim. (Cl. 285—341)

This invention relates to improvements in flareless rigid tube compression joint fittings for connecting a flareless rigid tube section with an axially adjacent part and in particular to the jointing of a rigid tube section to a rigid adaptor, or coupling part.

There have been many proposals of compression joint fittings of the type to which the present invention relates in which a deformable element fitted over one end of a rigid tube is connected to an axially adjacent rigid tube or coupling part by deforming a sleeve onto the tube through compressive force applied to the sleeve by the tightning of connector nut encircling the sleeve and screw connected to the other part to be coupled. Normally, however, these prior art joint fittings necessitate a preforming of one or both the parts to be connected and are not capable of being applied directly to the connecting of a rigid tube to a standard type coupling adaptor.

It is the object of the present invention to provide an improved compression joint assembly of the kind referred to which is capable of being applied to the connecting of a flareless rigid tube to a standard type coupling adaptor without the necessity of performing any pre-forming operation on the tube or the coupling adaptor.

The above and other objects and advantages of the invention residing in the construction, combination and arrangement of parts will appear clear from a consideration of the following detailed description with reference to the accompanying drawings, in which:

Fig. 1 is a half longitudinal section of a rigid tube joint connection means provided in accordance with the invention and showing the parts in position prior to tightening of the connector nut, Fig. 2 is a similar view to Fig. 1 but showing the condition of the joint parts upon completion of the tightening operation, and Fig. 3 is an exploded view, on a reduced scale, of the parts seen in Figs. 1 and 2.

Referring to the drawings, 10 indicates a length of rigid tubing of steel or aluminum alloy, for instance, and 12 indicates a standard adaptor having external screw-threading 14 and an annular bevelled end 16.

The tube 10 is connected with the adaptor 12 through the medium of the axially adjacent sleeve members 18 and 20 and the connector nut 22. The nut 22 is of elongated sleeve formation and presents an end portion 24 having an elongated bore 26, through which the tube 10 slidably extends, followed by an enlarged bore 28 containing the interior screw-threading 30, engageable with the adaptor screw-threading 14, the bores 26 and 28 being connected by an annular bevelled surface 32.

The sleeve 18 is of harder material than that of the tube 10 and is formed with a tubular portion 18a and an enlarged end 18b of angular section, said end providing an annular bevelled surface 18c and a radial annular surface 18d. The sleeve is axially slidable upon the tube 10 and is capable of being deformed into jointing engagement with the tube, as will be described. As is clearly shown in Fig. 1, the angles of the bevelled surfaces 18d and 32 are different, with the difference being taken up, as indicated in Fig. 2, by deformation of the corresponding end portion of the sleeve 18 onto the tube 10 upon tightening the nut 22.

The sleeve 20 presents a definite all round clearance, indicated at 34, between its exterior surface and the bore 28 of the nut, the clearance being such as precludes the possibility of this sleeve being deformed outwardly to foul the interior screw-threading 30 on the nut. On its interior, the sleeve is of step formation, defined by a tapered frusto-conical surface 20a, extending from one end of this sleeve to a cylindrical surface 20b, concentric with the outer surface of the sleeve and extending to an inwardly directed annular bevelled surface 20c, defining with the surface 20b, a hook-shape recess 36. At its outer end, adjacent the bevelled end surface 16 of the adaptor 12, the sleeve 20 is formed with a correspondingly bevelled surface 20d for compressive engagement with the adaptor surface 16 when the nut 22 is tightened.

To assemble the parts, having reference to Fig. 3 and to Fig. 2, the tube 10 is axially telescoped with respect to the bore 26 of the nut 22 so that an end portion of the tube is located within the enlarged nut bore 28, in position to have the sleeve 18 slid axially thereon, followed by the assembly of the sleeve 20, so that the end portion 10a of the tube is axially guided with respect to the sleeve surface 20b and is presented to the recess 36, with the end portion 18e of the sleeve 18 being also presented to the tapered surface 20a of the sleeve 20 and the bevelled surfaces 20d and 16 being also presented to one another as the nut 22 is initially threaded onto the adaptor 14. Such will be the condition of the parts upon completion of the initial assembling operation as seen in Fig. 1.

Upon tightening the nut 22 the sleeve 18 will be pushed axially towards the sleeve 20, with the end portion 18e being deformed inwards, by contact with the tapered surface 20, such that when the surface 18c is brought against the opposed end surface of the sleeve 20 the end 18e will bite into the surface of the tube 10, as indicated at B. At the same time, the opposite end of the sleeve 18 will be deformed inwards, as the angle clearance is taken up between the surfaces 18d and 32, and the sleeve will be deformed onto the tube 10 in firm gripping relationship thereto, as indicated at A. While the sleeve 18 is being thus deformed the end 10a will be maintained in circumferential point contact at C within the recess 36.

It will be realized, therefore, that the invention provides a relatively simple yet efficient means of jointing a rigid flareless tube to a standard adaptor, without the necessity of any pre-forming operation on the tube or adaptor.

Having thus disclosed the invention, what I claim as novel and wish to secure by Letters Patent is as follows:

A compression joint for the connection of a flareless rigid tube to a standard coupling adaptor having an external screw thread and a conical annular end wall comprising, in combination with said tube and adaptor, a coupling nut axially slidable upon said tube and having an internal screw thread at one end for engagement with the external screw thread of said adaptor, said nut being interiorly enlarged to define, with said adaptor, an annular recess surrounding the end portion of said tube in abutting relation to said adaptor, a conical wall of said nut defining an end wall of said recess, a first sleeve member axially slidable upon said tube end within said recess, said first sleeve member, prior to final assembly of the joint, having a cylindrical bore portion embracing said tube inwardly from its terminal end, an annular conical wall in opposed relation to said conical wall of said nut and of a more acute angle and a radial annular shoulder between said cylindrical portion and said conical wall of said sleeve, a second sleeve member having all around clearance within said recess, said second sleeve member having a conical end wall engaging with said conical end wall of said adaptor, a second conical wall on said second sleeve member spaced axially inward from said conical end wall of said second sleeve member and defining a hook shaped ledge against which the terminal end portion of said tube end abuts with radial support, said second sleeve member having a cylindrical bore portion leading into said ledge to provide clearance for the tube end and a bore portion tapering inwardly from its end adjacent the conical wall of said nut toward said ledge and merging with said cylindrical bore portion at a point axially spaced from said ledge, the axial extent of said tapered bore portion approximating the axial extent of said cylindrical portion of said first sleeve, said first sleeve member being disposed between said conical wall of said nut and said second sleeve member with said cylindrical portion of said first sleeve member in position to engage with said tapered bore of said second sleeve member whereby upon tightening said nut upon said adaptor, with said terminal end portion of said tube supported upon said second conical wall of said second sleeve member and said second sleeve member abutting said adaptor, said first sleeve member has axial movement relative to said second sleeve member to deform said cylindrical portion of said first sleeve member within said tapered bore and deform said more acute conical wall of said first sleeve member upon engagement between said shoulder and said second sleeve to conform to the conical end wall of said recess, deformation of said cylindrical portion within said bore acting to deform said tube end inwardly of the terminal end portion supported upon said ledge, the cylindrical bore portions of said first and second sleeves being similar in diameter and approximating the outside diameter of said tube end.

References Cited in the file of this patent

UNITED STATES PATENTS

| | | |
|---|---|---|
| 2,182,811 | Kocher | Dec. 12, 1939 |
| 2,453,127 | Guarnaschelli | Nov. 9, 1948 |
| 2,544,109 | Richardson | Mar. 6, 1951 |

FOREIGN PATENTS

| | | |
|---|---|---|
| 492,336 | Great Britain | Sept. 15, 1938 |
| 691,001 | Germany | May 14, 1940 |